Aug. 15, 1933.　　　　S. BRAND　　　　1,922,025
CASH REGISTER
Original Filed June 10, 1927　　5 Sheets-Sheet 1

Inventor
Samuel Brand
By
Carl Beust
His Attorney

Aug. 15, 1933.    S. BRAND    1,922,025

CASH REGISTER

Original Filed June 10, 1927    5 Sheets-Sheet 2

Inventor
Samuel Brand

By

Karl Beust

His Attorney

Aug. 15, 1933.  S. BRAND  1,922,025
CASH REGISTER
Original Filed June 10, 1927   5 Sheets-Sheet 3
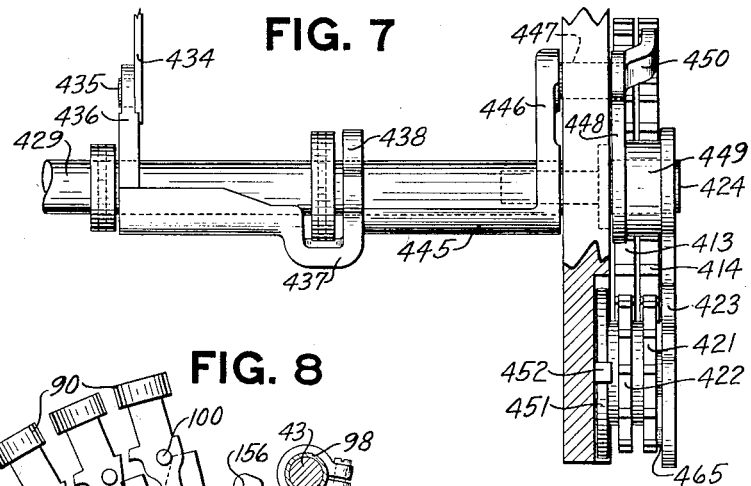
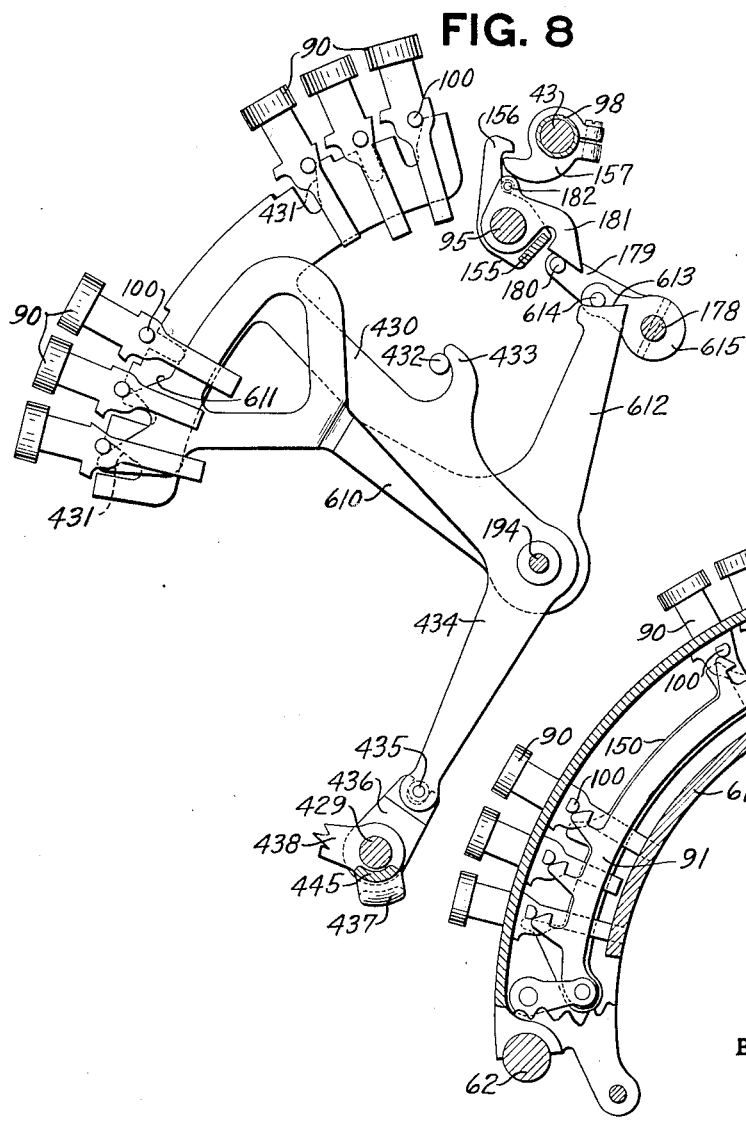
Inventor
Samuel Brand
By
His Attorney Aug. 15, 1933.     S. BRAND     1,922,025
CASH REGISTER
Original Filed June 10, 1927    5 Sheets-Sheet 4

Inventor
Samuel Brand
By Carl Beust
His Attorney

Aug. 15, 1933.  S. BRAND  1,922,025
CASH REGISTER
Original Filed June 10, 1927  5 Sheets-Sheet 5
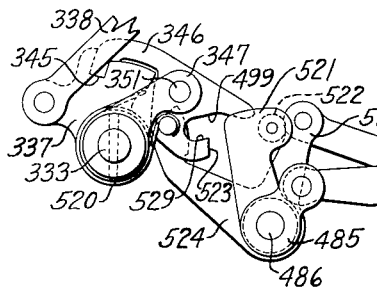
FIG. 14
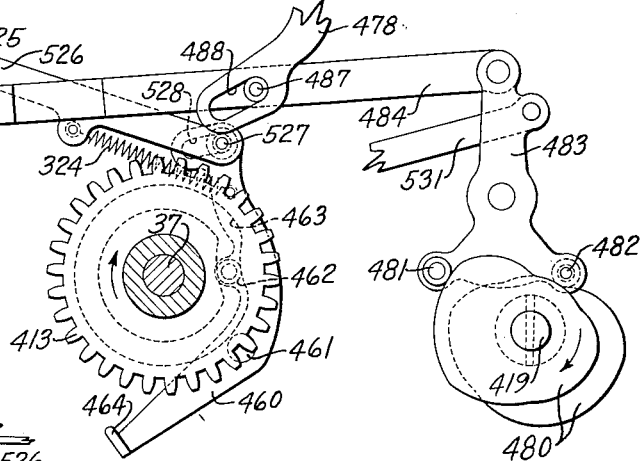
FIG. 15
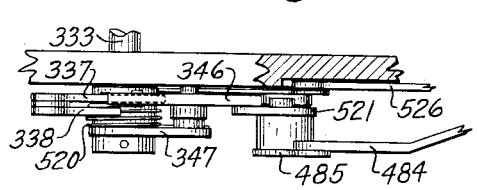
FIG. 16
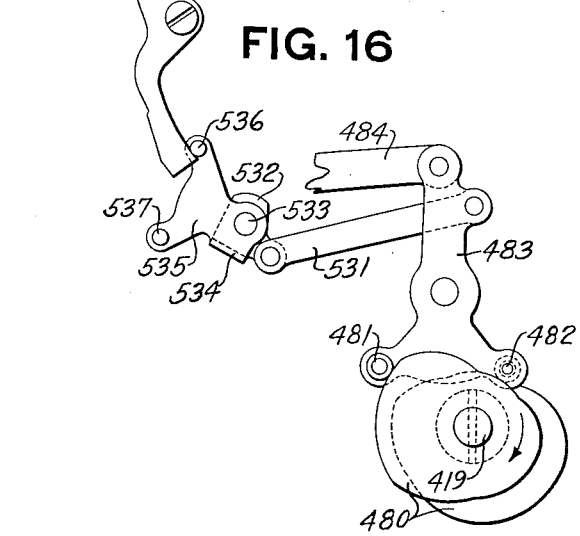
Inventor
Samuel Brand
By
Carl Beust
His Attorney Patented Aug. 15, 1933                                                          1,922,025

UNITED STATES PATENT OFFICE 1,922,025

CASH REGISTER

Samuel Brand, Dayton, Ohio, assignor to The National Cash Register Company, Dayton, Ohio, a Corporation of Maryland Original application June 10, 1927, Serial No. 197,941. Divided and this application November 28, 1930. Serial No. 498,680

14 Claims. (Cl. 235—27)

This invention relates to cash registers and like machines, and more particularly to the key release, and key lock mechanism, and is illustrated as applied to a machine of the type disclosed in applicant's co-pending application for United States Letters Patent, Serial No. 197,941, filed June 10, 1927, of which this application is a division; and the United States Letters Patent to Bernis M. Shipley, No. 1,761,542, issued June 3, 1930.

The machine of the parent application referred to, is adapted to enter the amount of an item into a totalizer, print such amount, reset the totalizer to zero, and print the total accumulated on the totalizer, in a continuous operation without any further manipulation of the controlling mechanism. In performing such operations the machine makes three cycles of operation, one cycle for adding the amount into the totalizer, and two cycles for resetting the totalizer to zero.

One object of this invention is to provide means to release the amount keys at the end of the adding cycle of operation, but maintain the control keys in their depressed positions until the end of the resetting operation.

Another object is to disconnect the release shaft from its restoring mechanism during the adding cycle of a three-cycle operation, and to re-engage the members near the end of the resetting operation.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings

Fig. 7 is a detail front elevation of a part of the mechanism for coupling the three-cycle control shaft to the main operating mechanism of the machine.

Fig. 8 is a detail view of the three-cycle detent associated with the first control bank to determine when a three-cycle operation is to be performed.

Fig. 9 is a detail view of the first control bank of keys.

Fig. 14 is a detail side elevation of a part of the three-cycle control mechanism.

Fig. 15 is a detail top plan view of part of the mechanism shown in Fig. 14.

Fig. 16 is a detail view showing a part of the three-cycle control mechanism.

General description

Figure 1:
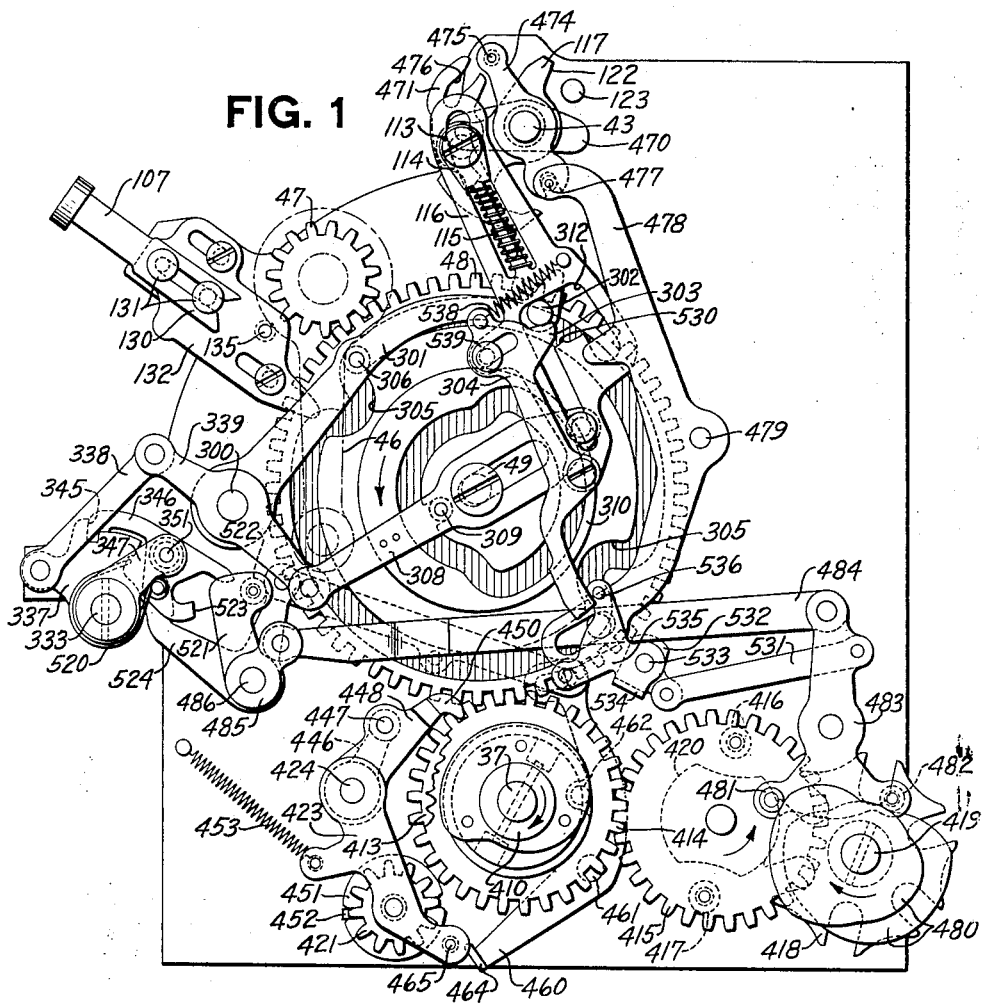
Fig. 1 is a view in right elevation of the machine.

In the various lines of business where a continuous balance of a customer's account is desirable, machines of the type shown in the previously mentioned Shipley patent have been used with great success.

In such systems, when an amount is to be either debited or credited to a customer's account, the operator removes the appropriate account card from the file and notes the balance thereon. The amount, whether a credit or debit, is then set on the keyboard and the machine operated, the amount being entered on an adding and subtracting totalizer, thus entering the old balance into the adding and subtracting totalizer. Any number of credit or debit items may then be entered into the totalizer, which results in a new balance, which can be printed by properly adjusting the machine, as is well known in the art. This adjustment is made through the medium of a total lever.

It was found, however, that this complete operation took considerable time, and therefore, applicant has provided an improvement to the existing mechanism, which considerably shortens the time necessary to complete the entire operation.

This invention makes it possible to perform both the adding or subtracting operation, and the total-printing operation, in one continuous operation.

This is accomplished by providing means for automatically making the necessary adjustments of the mechanism before a total printing operation, which adjustments were formerly made by manually setting the total lever. It is apparent that such an arrangement greatly decreases the time required to perform the complete operation, and at the same time reduces the chances of error on the part of the operator.

As the machine illustrated herein performs the adding, or subtracting, and the total taking operation in one continuous operation, it is necessary that all depressed amount keys be released at the end of the adding, or subtracting, cycle, and the control keys be maintained in their depressed positions in order to allow the machine to continue in operation to perform a totalizing operation, and select the proper totalizer during the total taking cycles of operation. It is to this end that the present invention is provided.

Machines of the previously mentioned type, are provided with a key release line which releases all depressed keys at the end of each operation of the machine.

One means of accomplishing the objects of this invention, is to construct the key release line, to permit a section of the line to operate without imparting any movement to the other section. To accomplish this, the section of the key release line which normally releases the "transaction" keys, is disconnected from the drive for the key release line before the key release line receives its movement to release the depressed "amount" keys.

The section of the key release line cooperating with the "amount" keys, being operated without imparting any movement to the section of the line cooperating with the "transaction" keys, releases all the depressed amount keys near the end of the adding cycle of operation. The section of the release shaft which releases the "transaction" keys is again coupled to the section of the release shaft which releases the "amount" keys near the end of the totalizing operation to release the depressed "transaction" keys.

A special detent acted upon by certain of the transaction keys, controls the machine to make the adding, or subtracting, and the totalizing operations, in one continuous operation of the machine. This requires three cycles of operation, one cycle for adding, or subtracting, and two cycles for totalizing.

The transaction keys acting on the detent to control the machine to perform an automatic totalizing operation, couples a gear drive intermediate the main drive shaft and a totalizing control shaft, causing the totalizing control shaft to receive one rotation during the three cycles of operation of the machine, one-third of a revolution during each of the three cycles of operation.

It is this control shaft that makes the proper adjustments necessary for a total taking operation, including the disconnecting of that part of the key release line at the proper time, to permit the transaction keys to remain depressed, and then reconnecting the section near the end of the second totalizing cycle, to release these keys in the usual manner.

Operating means

The present machine may be operated either by an electric motor or a crank, as desired. The electric motor is of the well known type used in the previously mentioned machines. This motor is adapted to rotate a shaft 37 (Fig. 1) supported by the machine side frames.

The shaft 37 is the main drive shaft of the machine, and is given one complete rotation on each adding, or subtracting, operation of the machine, and two complete rotations for each totalizing operation.

The starting of the motor is controlled by a key release shaft 43, in the well known manner, which is rocked by means hereinafter described, on the depression of the transaction keys and the starting key.

If for any reason the electric motor is not used, the machine may be operated by a crank handle 46, shown in dotted lines in Fig. 1. This handle is operatively connected to a gear 47, meshing with a large gear 48 mounted on a stud 49 in the right-hand side frame of the machine. The gear 48 meshes with a gear 413, fast on the right-hand end of the main drive shaft 37. Due to the gear ratio, it requires two complete rotations of the handle 46 to rotate the main drive shaft 37 once.

Keyboard

Figure 5:
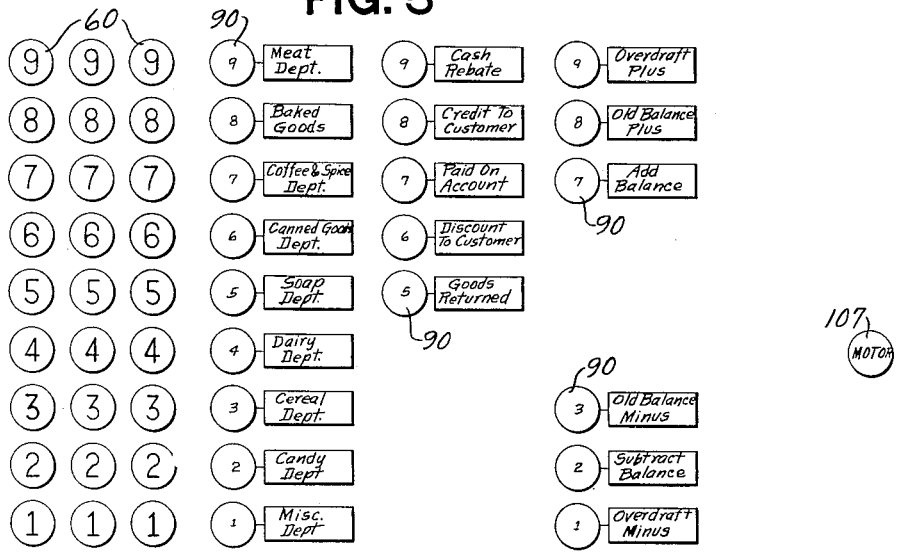
Fig. 5 is a diagrammatic view of the keyboard of the present machine.
Figure 6:
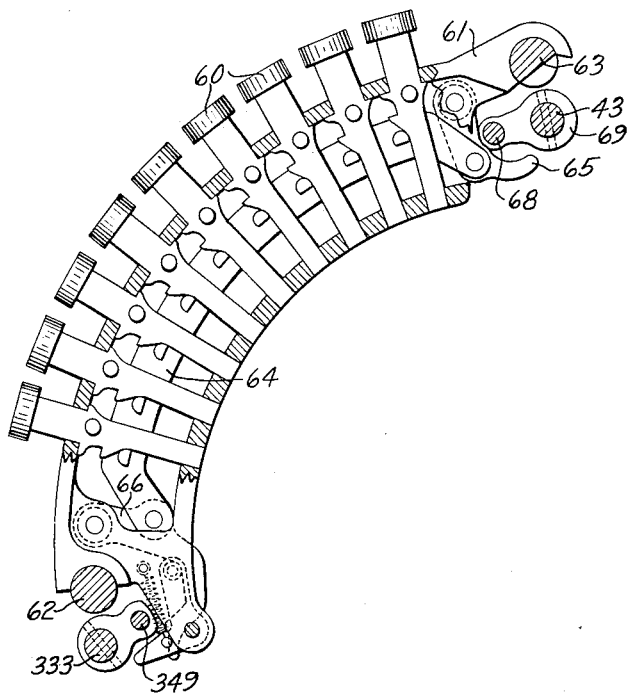
Fig. 6 is a detail view of one of the amount banks.

The machine illustrated is provided with a plurality of banks of amount keys 60 (Figs. 5 and 6). Any desired number of banks may be provided in order to give the machine the desired registering capacity. These banks are identically the same as the amount banks shown and described in the above mentioned Shipley patent, and the co-pending parent application, and therefore, a very brief description thereof will be given herein.

The amount keys 60 are mounted in key frames 61, supported at their lower ends by a rod 62, and at their upper ends by a rod 63, extending between the main side frames of the machine. Each key 60 cooperates with a detent 64. The detent 64 is supported by a link 65 at its upper end, and on arm 66 at its lower end. Each key is held in its undepressed position by the well known spring (not shown). Each key 60 is provided with a shoulder, which, when the key is depressed, contacts a corresponding pin on the detent 64, thereby rocking the detent downwardly until the shoulder on the key has passed the pin on the detent, whereupon the detent 64 moves upwardly under the usual spring tension, far enough to prevent the key from returning to its normal outer position.

The transaction keys are of the same general construction as the amount keys, and as illustrated, the machine includes three banks of transaction keys 90 (Fig. 5), reading from right to left, the banks will be referred to herein as the "first", "second", and "third" transaction banks, respectively. All three banks of transaction keys are constructed exactly alike, except that the number of keys in the banks vary according to the requirement of the system illustrated, and therefore, only the first bank is illustrated.

The transaction keys 90 (Fig. 9) are mounted in a key frame 61 similar to the frames of the amount keys, and supported on the previously described rods 62 and 63.

Each of the control keys 90 has a pin 100 to cooperate with an inclined surface on a detent 91 to cam the detent downwardly when a key is depressed. When the pin 100 on the depressed key has passed the respective inclined surface on the detent 91, the detent moves upwardly to position a corresponding hook over the pin 100 of the depressed key to retain the key depressed.

To insure the complete depression of a transaction key, an arm 92, supporting the upper end of the detent 91, has a projecting finger carrying a pin 93, projecting through the bifurcated end of an interlocking member 94, loosely mounted on a shaft 95, extending between the side frames of the machine.

The interlocking member 94 has a concentric edge 96, which, when the detent 91 is lowered by the depression of a key, rocks slightly counter-clockwise into a cooperating relation with a key release arm 97. The arm 97 is secured to a sleeve 98, which normally is connected to, and rocks with, the release shaft 43, in clockwise direction, this rocking movement of the shaft being necessary in order to release the machine, in a manner hereinafter described. However, with the edge 96 of the interlocking member 94 in the path of movement of the arm 97, the release shaft is held against movement.

Upon continued depression of a transaction key 90, the pin 100 mounted thereon passes the hook of the detent 91, permitting the detent 91, and the interlocking member 94, to return to their normal positions.

*Machine release*

In all machines of this type, there is a release shaft, such as the key release shaft 43 previously mentioned, which is rocked in clockwise direction (Fig. 1), to release the machine for operation by a powerful spring 115, supported by a link 116. The spring 115 exerts pressure against an arm 117 fast on the release shaft 43. Two spring pilots 114 are pivoted on a stud 113 carried by the arm 117, and provide a connection between the spring 115 and the arm 117.

Figure 2:
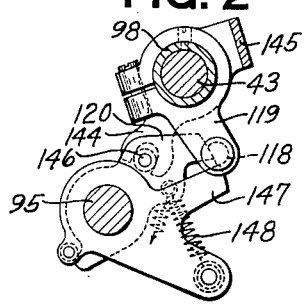
Fig. 2 is a detail side view of a part of the release mechanism.
Figure 10:
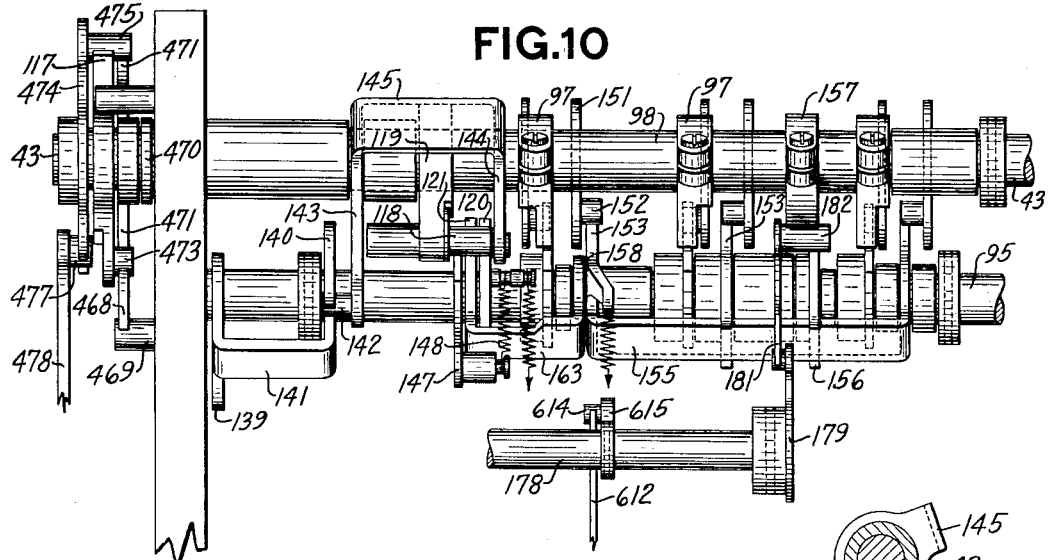
Fig. 10 is a detail rear elevation of the release and interlocking mechanism.
Figure 13:
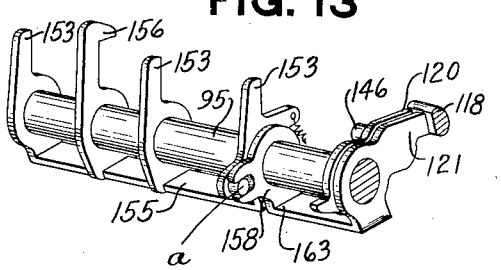
Fig. 13 is a detail perspective view of parts in the release mechanism.

Normally the release shaft 43 is prevented from rocking under the influence of the spring 115, by the contacting of a stud 118 (Fig. 2), carried by an arm 119, with a pair of retaining pawls 120 and 121 (Figs. 2, 10 and 13), pivotally mounted on the shaft 95. As long as either one of the retaining pawls 120 and 121 remains in the path of the stud 118, the shaft 43 cannot be rocked clockwise by the spring 115 to release the machine.

The retaining pawls 121 and 120 are withdrawn from the path of the stud 118, by the depression of a transaction key 90 (Fig. 5), and the depression of a motor or starting key 107, respectively.

Figure 12:
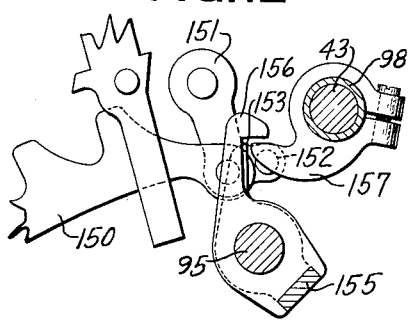
Fig. 12 is a detail view showing the interlock between the control keys and the release shaft.

The retaining pawl 121 is rocked out of the path of the stud 118 by a mechanism actuated by a control bar 150 (Figs. 9 and 12), one being provided in each transaction bank. Each control bar 150 is pivoted at its upper end to a supporting arm 151, (Fig. 12), carrying a pin 152 projecting therefrom, and into the plane of an upwardly extending arm 153, loosely mounted on the shaft 95. An arm 153 (Fig. 13) is provided above each transaction bank, the outer arms 153 being connected by a yoke 155, and the center arm 153 is bifurcated to straddle the yoke 155. Thus the three arms 153 and yoke 155 are rocked by depression of any one of the transaction keys 90, which keys, through pins 100, cam the control bar downwardly.

The two lowermost keys 90, of the first transaction bank, do not shift the control bar 150, since the control bar is notched opposite the pins 100 for these two keys. However, other means, hereinafter described, is provided for rocking the yoke 155, and thereby rocking the pawl 121 to the ineffective position.

The yoke 155 has a pin "*a*" projecting therefrom (Fig. 13), which cooperates with a forked arm 158 of a yoke 163, also loose on the shaft 95. At its right-hand end this yoke 163 is integral with the retaining pawl 121. Whenever the yoke 155 is rocked, as above described, by the depression of any one of the transaction keys 90, the yoke 163 is also rocked to withdraw the retaining pawl 121 out of the path of the stud 118, leaving the stud 118 retained by the retaining pawl 120, which is withdrawn by the motor starting key 107.

A means is provided to compel the complete depression of a transaction key 90 before the shaft 43 can be released, which comprises a hooked arm 156 (Figs. 12 and 13) pivoted on the shaft 95, and bifurcated to straddle the yoke 155. The hooked arm 156 normally cooperates with an arm 157, secured to the sleeve 98, the sleeve being normally coupled to, and rocks with, the release shaft 43. The arm 157 has a projecting finger which lies just beneath the hook of the arm 156, thereby preventing any movement of the release shaft in clockwise direction to release the machine for operation, until the yoke 155 is rocked by the depression of a transaction key, as previously described. This movement of the yoke 155 rocks the hooked arm 156 counter-clockwise, permitting the arm 157 and key release shaft 43, when released by the starting key, to rock unobstructed, to release the machine for operation. The inclined edges of the control bar 150 are so shaped that the hooked arm 156 is not completely withdrawn from the path of the arm 157 until the transaction key is latched down by the detent 91. This prevents mismanipulation of the machine by withdrawing the pawl 121, and then permitting the key 90 to release.

As explained in the parent application referred to above, the first transaction bank controls the selection of a column for printing. As described in said application, the zero stop pawl for the first transaction bank controls the selection of a certain column, which column is selected when any one of the two lowermost keys are depressed. Thus it is necessary to prevent the rocking of the zero stop pawl for the first control bank, to its ineffective position upon depression of one of these two keys. To this end control bar 150 (Fig. 9) is recessed opposite the two lowermost keys 90 of the first transaction bank, and therefore, depression of either one of these two keys does not actuate the control bar 150 to withdraw the pawl 121, as heretofore described. For this reason other means is provided to withdraw the retaining pawl 121 to its ineffective position, by the depression of the two lowermost keys in the first transaction bank.

A special control bar 610 (Fig. 8) provided in the first transaction bank of keys, has inclined walls 611 in position to cooperate with the pins on the two lowermost keys in this bank. The special control bar 610 has an upwardly extending arm 612, having a cam surface 613 formed on its upper end, cooperating with a pin 614, projecting from an arm 615 secured to a shaft 178. Also secured to the shaft 178 is an arm 179, carrying a stud 180, cooperating with the lower end of an arm 181, pivoting on the shaft 95. The arm 181 carries a stud 182, normally bearing against the hooked arm 156 which straddles the yoke 155.

Thus, depression of either of the two lowermost keys in the first transaction bank, rocks the special control bar 610 counter-clockwise about its pivot 194 to wipe the cam surface 613 of the upwardly extending arm 612 against the pin 614 carried by the arm 615, to rock the shaft 178 clockwise. The arm 179 on its clockwise movement with the shaft 178, through the stud 180 projecting therefrom, rocks the arm 181 counter-clockwise, causing the stud 182 to rock the hooked arm 156 and the yoke 155 counter-clockwise. The counter-clockwise movement of the yoke 155 removes the retaining pawl 121 (Fig. 13), from the path of the stud 118, in the previously described manner.

Figure 11:
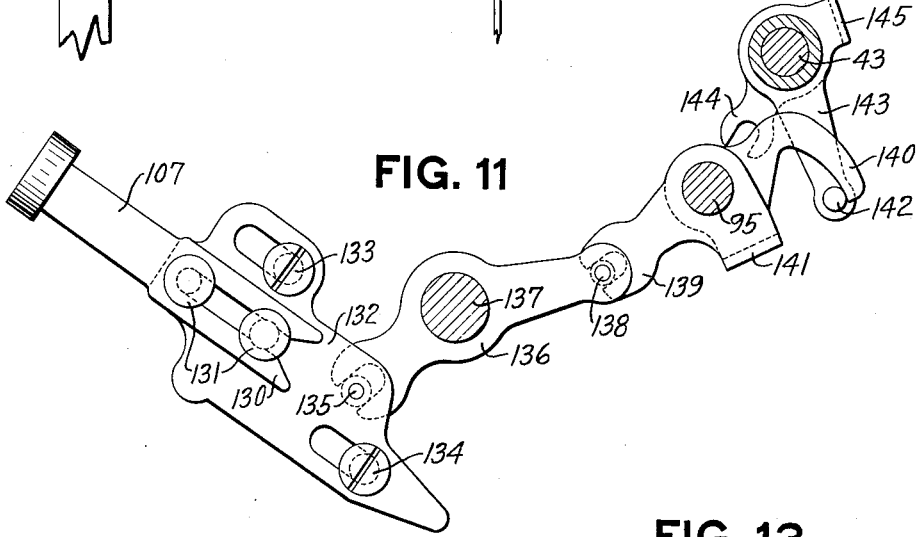
Fig. 11 is a detail side elevation of the motor key and part of the mechanism actuated thereby.

After the retaining pawl 121, and the hooked arm 156 have been moved to an ineffective position, by depression of a transaction key 90, the starting key 107 (Fig. 11) must be depressed to withdraw the retaining pawl 120 from the path of the stud 118.

The shank 130 of the starting key 107, is bifurcated and removably mounted on a pair of studs 131, carried by a plate 132, slidably mounted on studs 133 and 134, supported by the right-hand side frame. The plate 132 also carries a pin 135, embraced by the bifurcated end of one arm of a lever 136, pivoted on a stud 137 in the right-hand side frame of the machine. A pin 138 projecting from the opposite arm of the lever 136 is embraced by the bifurcated end of an arm 139, pivoted on the shaft 95. The arm 139 is connected with a hooked arm 140 by a yoke 141. When the starting key 107 is depressed, the hooked arm 140, through the yoke 141, arm 139, lever 136, and plate 132, is rocked clockwise about the shaft 95.

A stud 142 carried by an arm 143 pivoted on the key release shaft 43, is adapted to cooperate with the inner periphery of the hooked arm 140. The hooked arm, due to the curvature of its inner periphery, cams the stud 142 to rock the arm 143 clockwise about its pivot. Connected to the arm 143 by a yoke 145, (Figs. 2 and 11) is a bifurcated arm 144 embracing a stud 146 projecting from the retaining pawl 120, which normally prevents movement of the stud 118 and arm 119, and thereby prevents the release of the machine.

Therefore, when the arm 143, yoke 145 and arm 144 are rocked clockwise by the depression of the starting key 107, the retaining pawl 120 is rocked counter-clockwise about the shaft 95, and is thereby withdrawn from the path of the stud 118.

Thus, since the retaining pawl 121 is withdrawn from the path of stud 118 by depression of a transaction key 90, and the retaining pawl 120 is withdrawn from the path of the stud 118 by the starting key 107, the key release shaft 43 is free to be rocked in a clockwise direction by the spring 115, (Fig. 1) until arrested by the face 122 of the arm 117 striking a stud 123 projecting from the right side frame. The stud 118 is then positioned beneath the retaining pawls 120 and 121, and above a pawl 147 (Fig. 2) loose on the shaft 95. This pawl 147 is the well known non-repeat pawl which prevents an immediate second operation of the machine, should the motor starting key 107 be held in its depressed position at the end of a normal adding operation of the machine. The pawl 147 is connected to the pawl 120 by a spring 148.

The clockwise movement of the key release shaft 43 releases the machine for operation, whereupon the motor drives the main drive shaft 37 one complete rotation in the well known manner.

The main drive shaft operates differential mechanisms controlled by the depressed keys, which in turn, control the selection of the totalizers, the amounts to be added therein, the setting of the indicators, and setting type carriers according to the value of the depressed amount keys, as is old and well known in the art.

Key release

Near the end of a normal adding operation, the release shaft 43 is rocked in a counter-clockwise direction past its normal position, to release the depressed keys, and then clockwise to its normal position, where it is arrested by the retaining pawls 120 and 121 until again released for operation. The means for restoring the release shaft to its normal position, includes the well known gear 48 (Fig. 1) which receives one-half of a rotation during a normal adding operation of the machine. The gear 48 actuates an arm 301 pivoted on a stud 300, projecting from the right side frame. The arm 301 carries a stud 302 normally abutting against a shoulder 303, formed on a coupling lever 304, pivoted to the previously mentioned link 116. The arm 301 is provided with the usual roller 306 projecting into a cam groove 305 formed in the side of the gear 48. The cam groove 305 is so shaped that near the end of each operation of the machine, the arm 301 is rocked clockwise and then counter-clockwise to normal position.

On the clockwise movement of the arm 301, the stud 302 contacting the shoulder 303 of the coupling lever 304, moves the coupling lever 304 and link 116 downwardly, the upper end of the slot in the link 116 striking a stud 113 on the arm 117 to rock the arm 117 and shaft 43 counter-clockwise beyond its normal position. During the counter-clockwise movement of the release shaft 43, a universal rod 68 (Fig. 6) carried by a plurality of arms 65 secured on the release shaft 43, strikes tails formed on the upper detent supporting links 66, to move the detents 64 downwardly far enough to permit the shoulders on the keys to pass the pins carried by the detents, and thereby permit the usual key springs (not shown) to return the depressed amount keys 60 to their normal undepressed positions.

The depressed transaction keys 90 are released by the arms 97, (Fig. 9), there being one arm 97 for each transaction bank of keys. The arms 97 are secured to the sleeve 98, which sleeve is normally coupled to and rocks with the key release shaft 43, have tails 99, which, on the counter-clockwise movement of the shaft 43, are adapted to rock the detents 91 downwardly to release the depressed transaction keys 90, as is well known in the art.

The return movement of the shaft 43, through arm 119 (Fig. 2) withdraws the stud 118 from between the pawls 120—121 and the non-repeat pawl 147, to permit the pawls 120 and 121 to return into the path of the flat face of the stud 118, in the usual and well known manner.

After the arm 301 (Fig. 1) reaches the limit of its clockwise movement, to rock the release shaft 43 counter-clockwise past its normal position, the cam groove 305 returns the arm 301 counter-clockwise to its normal position. The counter-clockwise movement of the arm 301 restores the link 116 toward its normal position and permits the spring 115 to rock the release shaft 43 clockwise until the shaft 43 is arrested by the previously described retaining pawls 120 and 121. The link 116 continues to move to its normal position and compresses the spring 115. This stores enough energy in the spring 115 to permit it to actuate the release shaft as soon as the retaining pawls 120 and 121 are again removed from their effective position for the next operation of the machine.

Three-cycle operation

In automatic totalizing operations the machine makes three continuous cycles of operation, one cycle for adding or subtracting, and the usual two cycles necessary for totalizing.

On totalizing operations, a great many devices in the machine are set, or their condition changed, by the movement of the total lever. In order to accomplish the automatic totalizing operation it is necessary to provide means to automatically make all the adjustments of the machine, which were heretofore made by hand, inasmuch as in the present application the total lever remains in its add position throughout the three cycles of operation.

During the first cycle of a three-cycle operation, the machine performs the functions usually performed in a normal adding operation. At the beginning of a three-cycle operation the release shaft 43 is rocked in a clockwise direction in the usual manner to release the machine.

During totalizing operations it is essential that all of the amount keys be brought to their normal undepressed positions, before the second cycle of a three-cycle operation takes place, but as it is desirable to have the control keys remain depressed in order to select the proper totalizer for clearing, mechanism is provided for disconnecting the sleeve 98 (Fig. 9), which carries the release mechanism for the control keys, from the release shaft 43.

A special control shaft 419 (Fig. 1), is provided which disconnects the sleeve 98 from the release shaft, and automatically makes all the adjustments in the machine, which are normally made by the adjustment of the totalizing lever, during an automatic totalizing operation. This control shaft 419 operates only during automatic totalizing operations, and is given one complete rotation during the three cycles of operation of the machine.

The first, second, seventh and ninth keys of the first transaction bank (Fig. 8), control the drive for the control shaft. Thus, when one of these four keys is depressed, the driving means is made effective, to drive the control shaft, giving it two increments of movement during each of the three cycles of operation. These four keys are referred to hereinafter as the "three-cycle" keys.

The driving means for the control shaft 419 is shown in Fig. 1, and will now be described. A hub 410 pinned to the right-hand end of the main drive shaft 37, carries the previously mentioned gear 413, which receives a complete clockwise rotation on each cycle of operation of the machine. Loosely mounted on the hub 410 is a second gear 414 identical with the gear 413. The gear 414 meshes with a similar gear 415, which carries two rollers 416 and 417 projecting from the side thereof, to cooperate with a Geneva plate 418, fast on the control shaft 419 journaled in the side frames of the machine. The gear 415 carries a locking disk 420 which cooperates with the Geneva plate 418 to prevent movement thereof when either of the pins 416 or 417 is out of engagement therewith.

When a three-cycle operation is to be effected, the gear 413 is operatively connected to the gear 414 by two identical pinions 421 and 422 (Figs. 1 and 7) supported by an arm 423, pivoted on a stud 424, supported by the right-hand side frame of the machine. As these two pinions 421 and 422 are secured together, it is evident that when they are rocked into engagement with the two gears 413 and 414, the driving movement of the gear 413 is transmitted to the gear 414 which drives the gear 415 and the Geneva plate 418 for rotating the control shaft 419.

Rocking the arm 423, in order to engage the pinions 421 and 422 with the gears 413 and 414, is controlled by the depression of any one of the four "three-cycle" keys (Fig. 8) in the first transaction bank.

A three-cycle control plate 430 (Fig. 8) pivoted at 194 is formed with an inclined surface 431, to cooperate with each of the "three-cycle" keys. Thus, depression of any one of the 'three-cycle" keys rocks the control plate 430 clockwise, while depression of any other key in this bank does not rock the "three-cycle" control plate, since there is a straight notch opposite the pin 100 for these keys.

A downwardly extending arm 434 of the "three-cycle" control plate 430 carries a projection 435, which enters a bifurcated arm 436, pivoted on a shaft 429. The arm 436 (Figs. 7 and 8) is connected by a yoke 437 with an arm 438. A second yoke 445 connects the arm 438 with an arm 446 also pivoted on the shaft 429. The arm 446 (Figs. 1 and 7) carries a stud 447 projecting through an opening in the side frame, and is joined to an aligner arm 448 loose on the stud 424. The arm 448 is connected by a hub 449 to the supporting arm 423, which carries the pinions 421 and 422.

It is evident that depression of a "three-cycle" key in the first transaction bank rocks the control plate 430 (Fig. 8) clockwise, and rocks the arm 436, yokes 437 and 445 and arm 446 (Fig. 1), counter-clockwise. This rocks the arm 448 and the arm 423 supporting the pinions 421 and 422 also counter-clockwise against the tension of a spring 453, far enough to engage these pinions with the gears 413 and 414, to render the control shaft driving mechanism effective.

The control plate 430 (Fig. 8) is normally prevented from moving counter-clockwise past its normal position under influence of the spring-tensioned arm 423 (Fig. 1) by a pin 432 (Fig. 8) which cooperates with a finger 433 of the control plate 430.

The gear 414 is normally held in its properly aligned position by a tooth 450 carried by the arm 448, which normally extends between two of the teeth of this gear. However, when the arm 448 connected with the arm 423 is rocked counter-clockwise to engage the pinions 421 and 422 with the gears 413 and 414, the tooth 450 is disengaged from the gear 414 to permit rotation thereof.

In order to align the pinions 421 and 422 so that the teeth of the pinions will enter the teeth space of the gears 413 and 414, a lug 452 (Fig. 7) projecting from the side frame, enters a notch cut in a disk 451 secured to the pinions 421 and 422, to hold the pinions 421 and 422 against rotation when disengaged from the gears. However, as the pinions are rocked to their effective position, the notch of the disk 451 is disengaged from the lug 452, as the teeth of the pinions 421 and 422 engage the gears 413 and 414.

There are two notches in the disk 451, because the pinions 421 and 422 are so proportioned to the gears 413 and 414, that the pinions receive 2½ complete rotations to one rotation of the gears, and therefore, it is necessary to have one of the aligning notches in each side of the disk 451.

Means is provided for locking the pinions in their engaged position, when the pinions 421 and 422 are rocked into engagement with gears 413 and 414, until near the end of the "three-cycle" operation. This means consists of a lever 460 (Fig. 1) pivoted at 461 to the machine side frame, and carries a roller 462 (Fig. 14) projecting into a cam groove 463 formed on the inside of the previously described gear 413. It can be seen from Fig. 14 that immediately upon the beginning of the rotation of the gear 413, the lever 460 is rocked clockwise.

At its lower end this lever 460 has a flange 464 which, when the lever is rocked as above described, takes a position to the left of a pin 465, as viewed in Fig. 1, carried by the lower end of the arm 423, when a three-cycle key is depressed. The flange 464 will thus hold the pinions 421 and 422 in engagement with the gears 413 and 414, throughout such three-cycle operation. If, however, no three-cycle key has been depressed, the flange 464 is moved to the right of the pin 465, and thereby prevents movement of the arm 423 and the engagement of the pinions 421 and 422 throughout a single-cycle operation of the machine.

*First cycle of a three-cycle operation*

During the first cycle of a three-cycle operation, the machine performs the functions usually performed in a normal adding operation. The release shaft is rocked in clockwise direction, as is usual, in order to release the machine. It is necessary that all depressed amount keys be in their normal undepressed positions, before the second cycle of a three-cycle operation takes place, but as it is desirable to have the control keys remain depressed to select the proper totalizer for clearing, mechanism is provided for disconnecting the release shaft 43 from the sleeve 98, during the first cycle of the three-cycle operation. The mechanism for releasing the control keys is mounted on the sleeve 98, which normally rocks with the key release shaft 43. This sleeve 98 is connected with the release shaft 43 in the following manner.

Figure 3:
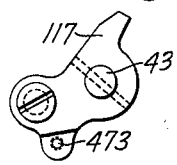
Figs. 3 and 4 are details of parts shown in Fig. 1.
Figure 4:
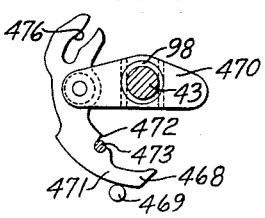

Fast to the end of the sleeve 98 is an arm 470 (Figs. 1, 4 and 10) supporting a coupling pawl 471, which has a notch 472 (Fig. 4) normally embracing a stud 473 (Figs. 3 and 4) projecting from the previously described arm 117, secured to the release shaft 43. It can be seen that the rocking movement of the arm 117 normally rocks the sleeve 98, due to the engagement of the notch 472 of the coupling pawl 471, with the stud 473 projecting from the arm 117.

It is apparent that all that is necessary in order to disconnect the sleeve 98 from the release shaft 43, is to rock the coupling pawl 471 clockwise far enough to disengage the notch 472 therein from the stud 473 carried by the arm 117.

This is one of the adjustments made by the control shaft 419, which operates only during a three-cycle operation.

In the first cycle of a three-cycle operation, the release shaft 43 is rocked as usual to release the machine for operation, and the pinions 421 and 422 (Fig. 1) are in mesh with the gears 413 and 414, thus driving the control shaft 419.

It will be remembered that the control shaft 419 receives two steps of movement during each cycle of a three-cycle operation. The roller 417 of the intermediate gear 415 enters one of the notches of the Geneva plate 418, and rotates the plate and shaft a distance equal to one-sixth of a complete rotation, or 60 degrees in clockwise direction. After the roller 417 has passed out of engagement from the notch in the plate, the roller 416 enters the next notch in the plate 418 and rotates the plate and shaft another 60 degrees. The shaft, therefore, is given 120 degrees, or one-third of the complete movement, on each cycle of a three-cycle operation.

Secured to the control shaft 419 (Figs. 1 and 14) is a pair of cams 480, adapted to rock a lever 483, one of the functions of which is to disengage the sleeve 98 from the release shaft 43.

The pair of cams 480 cooperate with a pair of rollers 481 and 482 carried by the lower end of the lever 483, which is supported by the right side frame, to rock the lever 483 at the proper time. At its upper end the lever 483 supports one end of a link 484, which at its left-hand end is pivoted to an arm 485 loose on a stud 486 projecting from the machine side frame. The link 484 carries a roller 487 (Fig. 14), which projects into a cam slot 488 formed in the lower end of a lever 478 (Fig. 1), pivoted on a stud 479 (Fig. 1) projecting from the side frame.

The first 60 degrees of movement the cams 480 receive, does not rock the lever 483, as the cams are concentric during this part of movement. During the second 60 degrees of movement that the cams 480 receive in the first cycle, the lever 483 is rocked counter-clockwise, causing the link 484 to move to the left, the stud 487 mounted therein rocking the lever 478 clockwise.

A stud 477 on the upper end of the lever 478 holds a lever 474 in the normal position (shown in Fig. 1). When the shaft 43, arm 117, coupling pawl 471, and arm 470 are rotated upon release of the machine a cam slot 476 in the coupling pawl 471 is moved to embrace a stud 475 of the lever 474, during the releasing movement of the pawl 471.

During the first cycle of a three-cycle operation, the lever 478 is rocked clockwise around the stud 479, to rock the lever 474 counter-clockwise. At this time the slot 476 embraces the stud 475, and therefore, the counter-clockwise movement of the lever 474 rocks the coupling pawl 471 to withdraw the notch 472 from the stud 473 on the arm 117. Subsequent rocking movement of the arm 117 and shaft 43, by the link 116, to release the amount keys at the end of the first cycle of a three-cycle operation, has no effect on the arm 470 and sleeve 98. Therefore, the releasing mechanism for the control keys remains inactive, and the control keys remain depressed to select totalizers during the second and third cycles of operation.

A stud 469 (Figs. 4 and 10) on the right side frame of the machine, normally maintains the notch 472 of the coupling pawl 471 in contact with the stud 473 of the arm 117. The lower wall of the coupling pawl 471 is concentric with the center of the release shaft 43, and therefore, when the pawl 471 rocks clockwise upon release of the machine, the stud 469, contacting the concentric edge of the pawl 471, maintains the connection between the notch 472 and stud 473 effective. However, at the end of such releasing movement a tail 468 on the pawl 471 escapes the stud 469 to subsequently permit the uncoupling movement of the coupling pawl by the levers 474 and 478, and stud 475. The pawl is so formed that after it is uncoupled the tail 468 thereof moves over the stud 469 to hold the pawl 471, arm 470, and sleeve 98 in their moved positions, when the shaft 43 moves to release the amount keys.

When the release shaft 43 is rocked counter-clockwise (Figs. 1 and 6) at the end of the first cycle of operation of the machine to move the rod 68 into contact with the links 65 to release the depressed amount keys, the sleeve 98 (Fig. 2) will not rock therewith, because the sleeve is disconnected from the shaft. Therefore, the arm 119 and the stud 118 thereon, remain in their operated positions to maintain the pawls 120 and 121 in the machine releasing position. After the shaft 43 has effected the release of the amount keys, it immediately returns to its machine releasing position, since the pawls 120 and 121 are held in released positions by the arm 119 and stud 118. Thus the machine continues to operate without interruption after the first cycle of operation.

It is during the operations of the machine following the first cycle in which the clearing of the totalizer is accomplished. The control shaft 419 makes the necessary adjustments to condition the machine to perform a totalizing operation, the machine operating through two cycles of operation necessary in clearing the totalizer. A shaft 333 (Fig. 1) is rocked clockwise just at the end of the first cycle, to prevent depression of the amount keys during the totalizing cycles of operation. This clockwise movement of the shaft corresponds to the movement it normally receives by the manual adjustment of the total lever to one of its totalizing positions, as fully disclosed in the parent case.

The rocking of the shaft 333 by manual adjustment of the total lever, couples a cam 310 and the intermediate gear 48 through link 338, lever 339, and pitman 308, and shifts a roller 309 into cooperative relation with the cam race of the cam 310, to rock the shaft 333 an additional movement during the operation to move the zero stop pawl of each amount bank into its ineffective position to permit the differentials in each bank to move under control of the totalizer elements, as is well known in the art.

During a three-cycle operation the total lever remains in its adding position, thus the connection between the total lever and the shaft 333 must be disconnected to permit the rocking of the shaft at the end of the first cycle of a three-cycle operation. This disconnection of the total lever and the shaft 333, and the rocking of the shaft at the end of the first cycle, is performed by the previously mentioned control shaft 419.

A torsion spring 520 (Figs. 1 and 14) encircles the shaft 333 and tends to rock the shaft clockwise. This movement is normally prevented by a pawl 346 pivotally supported on a stud 351 of an arm 347, secured to the shaft 333. The pawl 346 is normally in engagement with a notch 345 of an arm 337, pivotally mounted on the shaft 333. The arm supports one end of the previously mentioned link 338 which holds the arm 337 against any counter-clockwise movement, and forms an anchor for one end of the spring 520. Thus, it is necessary to disengage the pawl 346 from the notch 345 of the arm 337, before the shaft 333 is free to rock under the influence of the spring.

The link 484 is moved to the left by the second step of movement of the control shaft 419 during the first cycle of a three-cycle operation, as was previously described.

Secured to the hub of the arm 485, supporting the left-hand end of the link 484, is a disengaging arm 521, carrying a roller 522 to cooperate with a projection 523 of the pawl 346.

The counter-clockwise movement of the arm 521, when rocked by the movement of the link 484, causes the roller 522, mounted thereon, to strike the projection 523 of the pawl 346, and rock the pawl in clockwise direction about its pivot to disengage the end of the pawl 346 from the notch 345 of the arm 337. The arm 347 and the shaft 333 will then attempt to rock clockwise under the influence of the spring 520, but this movement is prevented at this time by the engagement of an upwardly extending arm 524, of a bell crank lever 525, pivoted on the stud 486, which at the beginning of the operation is rocked clockwise into the path of the pivot pin 351 of the pawl 346.

The shaft 333, as previously stated, is given its initial movement before the start of a normal total taking operation, by the adjustment of the total lever to one of its totalizing positions. On a three-cycle operation the shaft 333 must be moved slightly clockwise before the second cycle of operation, but not until the amount keys have been released. As the release of the amount keys occurs very near the end of the first cycle, the movement of the shaft 333 must be rapid. For this reason a snap movement is provided, controlled by the arm 524, which, as just mentioned, is in the path of the pivot pin 351 at this time. But, after the amount keys are released, the arm 524 is withdrawn from beneath the stud 351, to release the shaft 333 to the action of the spring 520.

As previously described, the lever 460 (Fig. 14) is rocked clockwise at the beginning of the operation of the machine, to lock the coupling pinions 421 and 422 in their effective position. The upper end of the lever 460 is provided with a slot 528, into which a stud 527 carried by a link 526 projects. The link is supported at its opposite end by the previously described bell crank lever 525. The stud 527 of the link 526 is normally held in contact with the right-hand end of the slot 528 by a spring 324.

As the lever 460 is rocked clockwise at the beginning of the cycle, the link 526, urged by the spring 324, moves to the right, rocking the bell crank lever 525 clockwise to position the arm 524 of the bell crank lever 525 in the path of the stud 351.

The arm 347 and shaft 333 are thereby held in their normal positions, after the pawl 346 is disengaged from the arm 337, by the arm 524. Very near the end of the first cycle the lever 460 is given its counter-clockwise movement by the cam groove 463, and through the link 526, restores the bell crank lever 525 and arm 524 to their normal position to withdraw the free end of the arm 524 from beneath the stud 351. This releases the shaft 333 to the action of the spring 520 to rock the shaft 333 rapidly clockwise.

As previously described, the first counter-clockwise movement of the lever 483, rocks the arm 521 and the roller 522 thereon, counter-clockwise a sufficient distance to withdraw the nose of the pawl 346 from the notch in the arm 337. The roller 522 is then in a position underneath the pawl 346. As this pawl, the arm 347, and shaft 333 rock clockwise, as above described, the movement of the shaft 333 is limited by a surface 499 on the pawl 346 contacting the roller 522.

*Second cycle of operation*

During the second cycle of operation it is necessary to give the shaft 333 an additional clockwise movement to move the zero stop pawls in the amount banks to their ineffective positions, to permit the differentials to be set according to the values on their respective totalizer elements.

As previously described, the control shaft 419 (Fig. 1) receives two steps of movement during the first cycle of operation, these two steps being equal to one-third of a complete rotation. During the second cycle of a three-cycle operation, the control shaft 419 receives two additional steps of movement, and therefore rotates another one-third rotation.

The section of the cams 480 cooperating with the rollers 481 and 482 during the first step of movement during the second cycle, is concentric, and therefore, does not rock the lever 483. However, near the end of the second cycle the cams 480 receive their second step of movement to rock the lever 483 counter-clockwise from the position to which it was moved during the first cycle of operation, to move the zero stop pawls to their ineffective positions.

The second counter-clockwise movement of the lever 483, (Fig. 14), through the link 484, gives the arm 521 and roller 522 a further counter-clockwise movement, during which the roller 522 enters a recess 529 in the pawl 346, formed by the projection 523 thereon, and rocks the pawl 346, arm 347, and shaft 333 clockwise. It is this second movement of the shaft 333 which moves the zero stop pawl of each amount bank to its ineffective position, as fully described in the above mentioned parent case, to permit movement of the actuator under control of the totalizer wheel.

The movement of the lever 478 (Figs. 1 and 14) during the first cycle, disconnects the sleeve 98 from the release shaft 43. During the movement of the link 484 and roller 487 during the second cycle, the cam slot 488 of the lever 478 is in a position, in which the roller 487 moves idly in the cam slot 488, without effecting any movement to the lever 478.

The stud 351 supporting the pawl 346 (Fig. 14) is rocked clockwise with the shaft 333 at the end of the first cycle, thus during the second and third cycles of operation, the stud 351 is in the path of the arm 524 of the bell crank lever 525, and prevents the bell crank lever 525 from rocking clockwise.

As the lever 460 is given a regular excursion on each cycle of operation, the slot 528 formed therein, moves idly over the stud 527, which projects from the link 526 connected to the bell crank lever 525, and merely stretches the spring 324.

Near the end of the second cycle of a three-cycle operation, the arm 301 (Fig. 1) is again rocked by the cam groove 305. To permit the machine to continue in operation, to complete its totalizing cycle, it is necessary that the sleeve 98 remain disconnected from the release shaft 43, so that the pawls 120 and 121 do not restore to their locking positions at the end of the second cycle of operation. It is also necessary that the release shaft 43 be prevented from rocking its normal distance at the end of the second cycle to prevent the rod 68 (Fig. 6), from striking the detent 65, which detent is locked against movement at this time by a rod 349 in the well known manner. This rocking of the release shaft 43 is controlled by rocking the coupling lever 304, to disengage the shoulder 303 from beneath the stud 302. This allows the stud 302 to rock idly in an opening 312 of the link 116, until it contacts a surface 530, which then causes the link to move with the arm 301, and the shaft 43 then receives only a slight movement, not sufficient to carry the rod 68 against the links 65. As the sleeve 98 is disconnected from the release shaft 43, the arm 119 (Fig. 2) does not move, and consequently, the pawls 120 and 121 remain in their releasing positions, thereby permitting the machine to continue in operation. The rocking of the coupling lever 304 is effected in the following manner.

Pivoted to the lever 483 (Figs. 1 and 16) is a link 531, which at its left-hand end is pivoted to an arm 532, pivoted on a stud 533 projecting from the main side frame of the machine. The arm 532 is connected by a yoke 534, to a striker arm 535, from which two studs 536 and 537 project laterally. In the normal position of the parts, as shown in Fig. 16, the stud 536 is in contact with the lower end of the coupling lever 304.

During the first cycle of operation, the lever 483 is rocked counter-clockwise as previously described, the link 531 rocking the arm 532 clockwise, and, through the yoke 534, rocks the arm 535 and stud 536 clockwise about a stud 533, moving it away from the lower end of the coupling lever 304.

The movement of the stud 536 away from the coupling lever 304 brings the stud 537 into contact with the left side of the coupling lever 304, but the movement of the stud 537 is not sufficient to rock the lever.

During the second cycle of a three-cycle operation, the lever 483 is rocked farther in counter-clockwise direction, as previously described, and as the stud 537 is now in contact with the left side of the coupling lever 304, continued movement of the striker arm 535 and stud 537 about the pivot stud 533, rocks the coupling lever 304 counter-clockwise against the influence of a spring 538 a sufficient distance to remove the shoulder 303 thereon from beneath the pin 302.

The coupling lever 304 is guided in its movement by a stud 539 projecting from the link 116, through a slot 540 in the lever 304.

Thus, as the arm 301 (Fig. 1) is rocked at the end of the second cycle, the shoulder 303 having been removed from beneath the stud 302, the stud 302 moves idly in the opening 312 until it contacts the surface 530, rocking the link 116 and release shaft 43 slightly, as above stated, but as the sleeve 98 is disconnected from the shaft 43, the shaft returns to its tripped position with the return of the stud to its normal position, and the machine continues in operation.

*Third cycle of a three-cycle operation*

Near the end of the third cycle of operation, it is necessary to again connect the sleeve 98, which carries the release mechanism for the control keys, with the release shaft 43, so that the depressed control keys may be released.

The cams 480 (Fig. 1) again receive two steps of movement during the third cycle, which, together with the steps of movement received during the first and second cycles, will have completed one complete rotation during the three cycles of operation of the machine.

During the first step of movement of the cams 480 in the third cycle, the lever 483 remains in the position to which it was rocked during the second cycle of operation. However, the second step of movement of the cams 480 receive, near the end of the third cycle, rocks the lever 483 clockwise to its normal position. This clockwise movement of the lever 483 to its normal position moves the link 484 to the right, restoring the shaft 333 in counter-clockwise direction to its normal position, and causes the pawl 346 to re-engage the notch 345 of the arm 337.

The roller 487 (Fig. 14) on its return movement to normal position with the link 484 projecting into the cam slot 488 of the lever 478, rocks the lever 478 counter-clockwise to its normal position, and due to the engagement of the stud 477 (Fig. 1) with the lower end of the lever 474, rocks the latter clockwise moving the stud 475 from the bottom of the slot 476 in the pawl 471 to a position near the mouth of the slot, thus re-engaging the coupling pawl 471 with the stud 473 carried by the arm 117.

As the arm 117 is rocked with the shaft 43, the pawl 471, carried by the arm 470 secured to the sleeve 98, the notch of the pawl 471 being engaged with the stud 473 in the arm 117, causes the sleeve 98 and shaft 43 to rock as a unit.

The clockwise movement of the lever 483 (Fig. 16) through the link 531, also rocks the striker arm 535 counter-clockwise to normal position, as shown in Fig. 16, permitting the spring 538 to rock the coupling lever 304 clockwise to position the shoulder 303 beneath the stud 302 (Fig. 1) in the arm 301.

When the arm 301 is rocked clockwise at the end of the third cycle, the stud 302 in engagement with the shoulder 303 of the coupling lever 304, moves the link 116 downwardly rocking the release shaft 43 and the sleeve 98 counter-clockwise past their normal position.

The sleeve 98 being operatively connected with the shaft 43, rocks with the shaft to release the depressed control keys at the end of the third cycle in the manner previously described.

When the sleeve 98 and shaft 43 are rocked counter-clockwise beyond their normal positions, the pawls 120 and 121 (Fig. 2) influenced by springs, take a position in the path of the stud 118, carried in the arm 119, and the sleeve 98 and shaft 43 are therefore held in their normal position, which stops the operation of the machine, and the pawls remain in the path of the stud 118 until again released for operation.

This adjustment of the parts leaves the machine in condition for either another three-cycle operation, a normal totalizing operation by adjustment of the totalizing lever, or an ordinary adding operation.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:—

1. In a machine of the class described, the combination of a release shaft; a tube surrounding a section of the shaft; a plurality of banks of keys; a plurality of members carried by the shaft and tube for releasing the keys; means to rock the shaft and tube as a unit to release any depressed keys; and means to automatically disconnect the tube from the shaft, and thereafter connect the tube and shaft, during certain operations to delay the release of certain of said keys.

2. In a machine of the class described, the combination of a release shaft; a tube surrounding a section of the shaft; a plurality of banks of keys; a plurality of members carried by the shaft and tube for releasing the keys; means to rock the shaft and tube as a unit to release any depressed keys; and a plurality of manipulative devices to cause the tube to be automatically disconnected from the shaft, and thereafter connect the tube and shaft, during certain operations to delay the release of certain of said keys.

3. In a machine of the class described adapted to operate through a plurality of cycles, the combination of a release shaft; a tube loose on the shaft; means to connect the tube to the shaft; a plurality of banks of amount keys; a plurality of banks of special keys; a plurality of members carried by the shaft for releasing the amount keys; a plurality of members carried by the tube for releasing the special keys; and means effective during the first cycle of operation to disconnect the tube from the shaft to release the amount keys only.

4. In a machine of the class described adapted to operate through a plurality of cycles, the combination of a release shaft; a tube loose on the shaft; means to connect the tube to the shaft; a plurality of banks of amount keys; a plurality of banks of special keys; a plurality of members carried by the shaft for releasing the amount keys; a plurality of members carried by the tube for releasing the special keys; means effective during the first cycle of operation to disconnect the tube from the shaft to release the amount keys only; and means to reconnect the tube and shaft during the last cycle of a plurality of cycles to release the special keys.

5. In a machine of the class described, the combination of a plurality of keys; a key release shaft; a tube on the shaft; a member fast on the shaft and having a pin projecting therefrom; an arm secured to the tube; a pivoted lever on the arm, said lever having a notch which normally engages the pin carried by the member to latch the tube to the shaft; and means to automatically rock the notch away from the pin to disconnect the tube from the shaft, and thereafter rock the notch into engagement with the pin, to delay the release of certain of said keys.

6. In a machine of the class described, the combination of a release shaft; a tube loose on the shaft; a member fast on the shaft and having a pin projecting therefrom; an arm secured to the tube; a pivoted lever on the arm, said lever having a notch which normally engages the pin carried by the member to latch the tube to the shaft; a cam slot formed in the lever; and a second lever pivoted on the shaft and having a pin adapted to cooperate with the slot to rock the first mentioned lever to disconnect the tube from the shaft.

7. In a machine of the class described, the combination of a release shaft; a tube loose on the shaft; a member fast on the shaft and having a pin projecting therefrom; an arm secured to the tube; a pivoted lever on the arm, said lever having a notch which normally engages the pin carried by the member to latch the tube to the shaft; a cam slot formed in the lever; a second lever pivoted on the shaft and having a pin adapted to cooperate with the slot to rock the first mentioned lever to disconnect the tube from the shaft; and means to automatically rock the second mentioned lever during certain operations of the machine.

8. In a machine of the class described, the combination of amount and special keys; means to release the amount and special keys at the end of the usual item entering operation, means to cause the machine to automatically perform an item entering operation and a total taking operation as one continuous operation; and means to control the releasing means to release the amount keys near the end of the item entering operation and the special keys near the end of the total taking operation.

9. In a machine of the class described, the combination of amount and special keys adapted to be depressed for item and total taking operations; means rendered active by certain of the special keys to cause the machine to perform such item and total taking operations in successive operations without interruption; means to release the depressed keys; and means to control the releasing means during the successive uninterrupted operations to release only the amount keys during item entering operations and the special keys during total taking operations.

10. In a machine of the class described, the combination of a normally locked machine release shaft; a plurality of keys; means operated by the keys to unlock the shaft to release the machine; a locking detent for the keys; means connected to the shaft and operable upon return movement of the shaft to move the detent to release the keys and to lock the release shaft; and means to disconnect the last mentioned means from the shaft to retain the keys depressed and to permit the shaft to automatically release the machine for an immediate subsequent cycle of operation.

11. In a machine of the class described, the combination with amount keys; control keys; a machine release shaft composed of two sections; and means to restore the shaft to its normal position; of a control shaft; driving means therefor effective upon depression of certain control keys; and a common means operable by the control shaft to render one section of the release shaft ineffective during one cycle and both sections ineffective during another cycle but effective during the last cycle, to permit the release of the amount keys and the control keys in different cycles.

12. In a machine of the class described, adapted to operate through a plurality of cycles; the combination with amount keys; control keys; and a machine release shaft composed of a number of sections; of a control shaft; driving means therefor, effective upon depression of certain control keys; a pivoted lever operable by the control shaft and adapted to be given a number of steps of movement; means operable by the pivoted lever during one of its steps of movement to disconnect one section of the release shaft; and means operable by the second step of movement of the pivoted lever to disconnect the other section of the release shaft, to permit release of the amount keys and control keys in different cycles of operation.

13. In a machine of the class described, adapted to operate through a plurality of cycles; the combination with amount keys; control keys; a machine release shaft one section of which cooperates with the amount keys and another section cooperates with the control keys; and means to rock the shaft at the end of each cycle of operation to release the depressed keys; of a control shaft; driving means therefor effective upon depression of certain control keys; a pivoted lever operable by the control shaft and adapted to be given a plurality of steps of movement; means operative during one step of movement of the pivoted lever to disconnect one section of the release shaft to prevent release of the control keys; and a second means operative during another step of movement of the pivoted lever to disconnect both sections of the release shaft, both sections being connected on the return of the pivoted lever to its normal position, permitting release of the amount keys and control key in different cycles of operation.

14. In a cash register adapted to be given a plurality of continuous cycles of operations, the combination of a release shaft, means for rocking said release shaft in one direction to release the machine, means for restoring said shaft to normal on every cycle of operation, and means for disabling said restoring means on the second of the plurality of cycles.

SAMUEL BRAND.